(12) United States Patent
Furuya

(10) Patent No.: US 6,219,051 B1
(45) Date of Patent: Apr. 17, 2001

(54) PORTABLE INFORMATION TERMINAL APPARATUS, DISPLAY SCREEN SCROLL METHOD, RECORDING MEDIUM, AND MICROCOMPUTER APPARATUS

(75) Inventor: Mami Furuya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/216,967

(22) Filed: Dec. 21, 1998

(30) Foreign Application Priority Data

Dec. 22, 1997 (JP) .................................................. 9-352736

(51) Int. Cl.⁷ .................................................. G06F 13/00
(52) U.S. Cl. .............................................. 345/341; 345/342
(58) Field of Search .............................. 345/341, 1, 145, 345/973, 340, 342, 339

(56) References Cited

U.S. PATENT DOCUMENTS

| | | | | |
|---|---|---|---|---|
| 4,602,251 | * | 7/1986 | Sawada et al. | 345/123 |
| 4,734,689 | * | 3/1988 | Kurakake | 345/123 |
| 5,717,420 | * | 2/1998 | Matsuzaki et al. | 345/97 |
| 6,072,487 | * | 6/2000 | Kakuta et al. | 345/341 |
| 6,078,313 | * | 6/2000 | Sezaki et al. | 345/168 |

\* cited by examiner

*Primary Examiner*—Raymond J. Bayerl
*Assistant Examiner*—Tadesse Hailu
(74) *Attorney, Agent, or Firm*—Jay H. Maioli

(57) ABSTRACT

A portable information terminal apparatus capable of high-speed display screen scroll processing. An up/down scroll command signal control unit detects the number of unprocessed scroll command signals. A display control unit activates a partial screen update unit if at least two unprocessed scroll command signals are found based on processing executed by the up/down scroll command signal control unit, and activates a total screen update unit if only one unprocessed scroll signal is found remaining. The partial screen updating unit partially updates a display screen based on processing by the display control unit, where as the total screen update unit totally updates the display screen based on processing of the display control unit.

6 Claims, 11 Drawing Sheets

FIG. 7

LUT (LOOK-UP TABLE)

| FILE NUMBER | ENTRY POINT |
|---|---|
| F1 | pt1' |
| F2 | pt2 |
| F3 | pt3 |
| F4 | pt4 |
| ⋮ | ⋮ |
| Fn | ptn |

IF (IMAGE FILE)

```
4 4 4 4
5 5 5 5
6 6 6 6
7 7 7 7
```

PORTABLE INFORMATION TERMINAL APPARATUS, DISPLAY SCREEN SCROLL METHOD, RECORDING MEDIUM, AND MICROCOMPUTER APPARATUS

BACKGROUND OF THE INVENTION

The present invention generally relates to a portable information terminal apparatus and a display scroll method. More particularly, the present invention relates to a portable information terminal apparatus, especially such a portable information terminal apparatus for executing signal communication by radio wave such as a pager that, when the terminal apparatus receives radio waves from a remote radio base station, the terminal apparatus confirms that the received signal is addressed to itself, notifies a user of the termination call by sound, light, or mechanical vibration, displays the received information on the incorporated image display device, and scrolls a display screen based on the commands inputted by the user. The present invention also relates to a method of scrolling the display screen.

Portable information terminal apparatuses having various constitutions and providing various capabilities and functioning as communication network terminals have been put in practical use to satisfy the recent wide-range and drastically expanding demands in information communication fields.

One example of such portable information terminal apparatuses is a pager commonly used for signal reception by radio. The pager in its infancy was a terminal apparatus that beeps upon reception of a calling signal from a radio base station. In operation, a caller sends a calling signal from a wire telephone through radio to the user carrying the pager on the road. Upon reception of the calling signal, the user makes a call to the caller from a nearby wire telephone.

Recently, pagers have been developed and are in extensive use that have capabilities of receiving not only a simple calling signal, but also a signal carrying various information from a radio base station and displaying the received information on the liquid crystal display monitor as a message.

Further, various other features are provided for today's paging devices. One common feature is the use of both beeping and mechanical vibration for notifying the user of calling signal termination. The mechanical vibration is activated instead of beeping in an environment where a surrounding noise level is so high that the user cannot hear beeping or where beeping may cause disturbance if used in a theater or a lecture room for example. The user can select between the beeping and vibrating modes by manually setting the selection through the data input device of the pager.

The above-mentioned portable information terminal apparatuses have data input devices through which the user specifies operating conditions. For such data input devices, key-type or button-type is used on the related-art portable information terminal apparatuses.

However, the key-type or button-type data input devices are not always suitable for a continuous data input operation. In addition, because these devices each provide a single function, the number of data input devices increases with the above-mentioned functional expansion of portable information terminal apparatuses, thereby making the operation of these apparatuses complicated and causing a bottleneck in miniaturization of these apparatuses.

To overcome this problem, a data input device of rotary type and a rotary input device with a push switch integrated have come to be used instead of the above-mentioned data input devices of key-type or a button-type. These data input devices are commercialized as a jog dial and rotary encoder for example. With these devices, a rotary disc knob of each device is rotated clockwise (to the right) or counterclockwise (to the left) to easily provide a control signal, thereby facilitating an operation for generating a plurality of input signals in a unit time. In addition, two lines of input signals can be provided from one rotary input device, thereby saving the space to be occupied by data input devices.

Meanwhile, when displaying message information (a message statement) carried by a received signal onto the image display device, the number of lines displayed on the image display device is limited. Therefore, the message information can be displayed only in the maximum number of display lines (four lines for example). If a received message consists of many lines (four or more lines for example) of information, the screen of the image display device must be scrolled.

Generally, display scrolling is made up or down, replacing the currently displayed lines with updated new lines. Preferably, scrolling may be manually performed by the user for specifying scroll count, direction, and speed.

Especially, it is desirable to provide a constitution that allows the user to input a plurality of scroll commands in a relatively short time for quick confirmation of a message statement consisting of many lines. To realize this constitution, a high-speed scroll capability must be provided.

Obviously, the above-mentioned rotary input device, which allows the user to quickly perform clockwise and counterclockwise rotary operations to generate many input signals in a unit time, can be suitably applied to the scroll command inputting, thus at least satisfying the above-mentioned requirement of quick command input operations.

However, the above-mentioned in a related art constitution presents a problem that, while the above-mentioned rotary input devices allow the user to perform a plurality of scroll command input operations in a short time, the scroll processing capability of the portable information terminal apparatuses having these devices is sometimes incapable of following the speed of the input operations.

For example, assume that several scroll command input operations are consecutively performed in a short time through the data input device to effect a high-speed scroll operation on the display screen. If eight input operations are consecutively performed, eight scroll command signals are generated because one operation causes one scroll command signal. As a result, eight single-line-feed scroll operations are consecutively performed. According to the related art constitution, one scroll operation replaces the display image by one line, furthermore the entire display screen is updated each time and the updated screen is displayed at every scroll operation done.

Consequently, if the display updating speed of the liquid crystal panel of the image display device for example or the processing speed of peripheral circuits cannot promptly follow the high-speed scroll command input operations or the CPU of the portable information terminal apparatus is not powerful enough to promptly follow the scroll command input operations, every scroll operation, especially every display updating operation takes time to cause a sense of disagreement between the scroll command input operation and the scroll processing, thereby degrading the ease of operation of portable information terminal apparatuses.

SUMMARY OF THE INVENTION

It is therefore an object of the present invention to provide a portable information terminal apparatus and a display screen scroll method that are capable of promptly and smoothly scrolling the display on the image display device.

In a display scroll method for a portable information terminal apparatus according to the present invention, a display screen is scrolled by the number of times a scroll command signal is provided, wherein, if at least two unprocessed scroll command signals are found, the display screen is partially updated and a partially updated display screen is displayed and, if there remains only one unprocessed scroll command signal, the display screen is entirely updated and an entirely updated display screen is displayed.

Consequently, the screen displayed during the continuous execution of scroll processing is updated not entirely but partially, thereby ending this scroll processing as early as possible to execute the next scroll processing without delay. As a result, the loads on the CPU and the display device and its peripheral circuits can be mitigated to substantially enhance a response speed, thereby ensuring a smooth display screen even during continuous scroll processing. In addition, in the final stage of the continuous scroll processing, the entire display screen is updated and the entirely updated display is displayed, thereby completing the continuous scroll processing, making the user feel quite normal.

The portable information terminal apparatus of the present invention, having a radio communication means, a control means for at least executing data processing, a display screen capable of executing upward scrolling and downward scrolling at least on a display line basis, and an input device for generating at least one of up-scroll command signal and a down-scroll command signal according to an operation by a user, wherein a radio wave transmitted from a transmission base station is received by the radio communication means and the control means extracts information from a terminating signal carried by the radio wave to at least display the extracted information onto the display screen, the portable information terminal apparatus comprising: an up/down scroll command signal control means capable of detecting the number of unprocessed scroll command signals; a display control means for activating a partial screen update means if at least two unprocessed scroll command signals are found based on processing executed by the up/down scroll command signal control means and activating a total screen update means if only one unprocessed scroll signal is found remaining; the partial screen update means partially updating a display screen based on processing by the display control means; and the total screen update means totally updating the display screen based on processing of the display control means.

Consequently, if there are at least two unprocessed scroll command signals detected by the up/down scroll command signal control means, the display control means determines that a continuous scroll processing operation is being executed continuously and it is not the last one and then activates the partial screen update means to partially update the display, upon which the next scroll processing operation starts. As a result, the loads to the CPU and the display device and its peripheral circuits can be mitigated to substantially enhance a response speed, thereby ensuring a smooth screen display even during continuous scroll processing.

If there is only one unprocessed scroll command signal remaining and the display control means determines that this is the last scroll processing operation in the sequence of the scroll processing operations, the display control means activates the total screen update means to update the display screen in its entirety. Therefore, this causes no functional problem and completes the continuous scroll processing, making the user feel quite normal.

In the portable information terminal apparatus according to the present invention, the input device has an operation block rotatable clockwise and counterclockwise and the rotary input device generates a plurality of up-scroll command signals or down-scroll command signals in a unit time.

This constitution facilitates a plurality of input operations for requiring a continuous sequence of scroll processing operations. In addition, quickly performing the plurality of input operations through this rotary input device matches the quick and smooth continuous scroll processing, thereby eliminating discrepancy between input speed and scroll speed. Consequently, the rotary input device further enhances the functional advantages of the portable information terminal apparatus.

In a recording medium according to the present invention, a scroll command signal control means for detecting the number of unprocessed scroll command signals stores at least; a display control means for activating a partial screen update means if at least two unprocessed scroll command signals are found based on processing executed by the scroll command signal control means and activating a total screen update means if only one unprocessed scroll signal is found remaining; the partial screen update means partially updating a display screen based on processing by the display control means; and the total screen update means totally updating the display screen based on processing of the display control means in the recording medium as procedures (or programs) readable and executable by the computer.

Consequently, installing this recording medium on the portable information terminal apparatus having the central processing unit, the input device, the display screen device, and the message recording memory as a memory for storing operating procedures executable by the central processing unit mitigates the loads to the CPU and the display device and its peripheral circuits halfway through the continuous sequence of scroll processing operations to substantially enhance a response speed, thereby ensuring a smooth screen display even during continuous scroll processing.

The microcomputer apparatus according to the present invention, having a recording block for storing at least; a scroll command signal control means for detecting the number of unprocessed scroll command signals; a display control means for activating a partial screen update means if at least two unprocessed scroll command signals are found based on processing executed by the scroll command signal control means and activating a total screen update means if only one unprocessed scroll signal is found remaining; the partial screen update means partially updating a display screen based on processing by the display control means; and the total screen update means totally updating the display screen based on processing of the display control means as programs executable by the central processing unit.

Consequently, combination of this microcomputer apparatus with a communication block, a storage memory for received messages, a rotary input device, a display device for displaying messages and so on, and a power supply circuit mitigates the loads to the CPU and the display device and its peripheral circuits halfway through the continuous sequence of scroll processing operations to substantially enhance a response speed, thereby ensuring a smooth screen display operation even during continuous scroll processing.

While the preferred embodiments of the present invention have been described using specific terms, such description is for illustrative purposes only, and it is to be understood that changes and variations may be made without departing from the spirit or scope of the appended claims.

BRIEF DESCRIPTION OF THE DRAWINGS

These and other objects of the invention will be seen by reference to the description, taken in connection with the accompanying drawing, in which:

FIG. 7 is a diagram illustrating an area/table arrangement in the working memory of the portable information terminal apparatus associated with the invention;

DETAILED DESCRIPTION OF PREFERRED EMBODIMENTS

This invention will be described in further detail by way of example with reference to the accompanying drawings. It should be noted that the preferred embodiments to be described later are only some of the preferred examples that are intended for use in describing the essential constitutions and functions of the present invention. Therefore, despite various limitations preferred in technological constitution, the present invention is not limited to these preferred embodiments unless otherwise specified.

Figure 1:
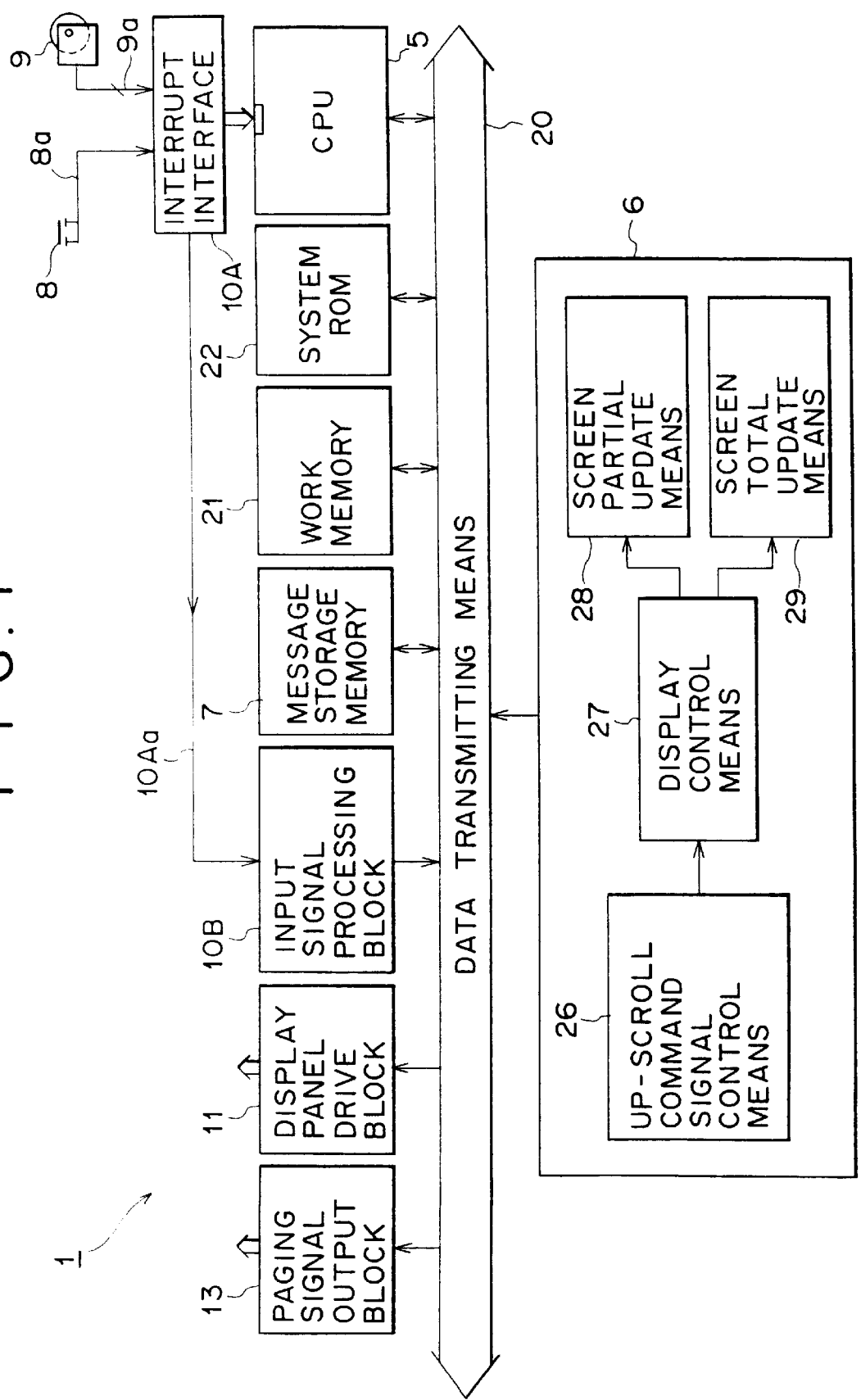
FIG. 1 is a block diagram illustrating a main constitution of a pager, which is a portable information terminal apparatus practiced as one preferred embodiment of the invention.
Figure 2:
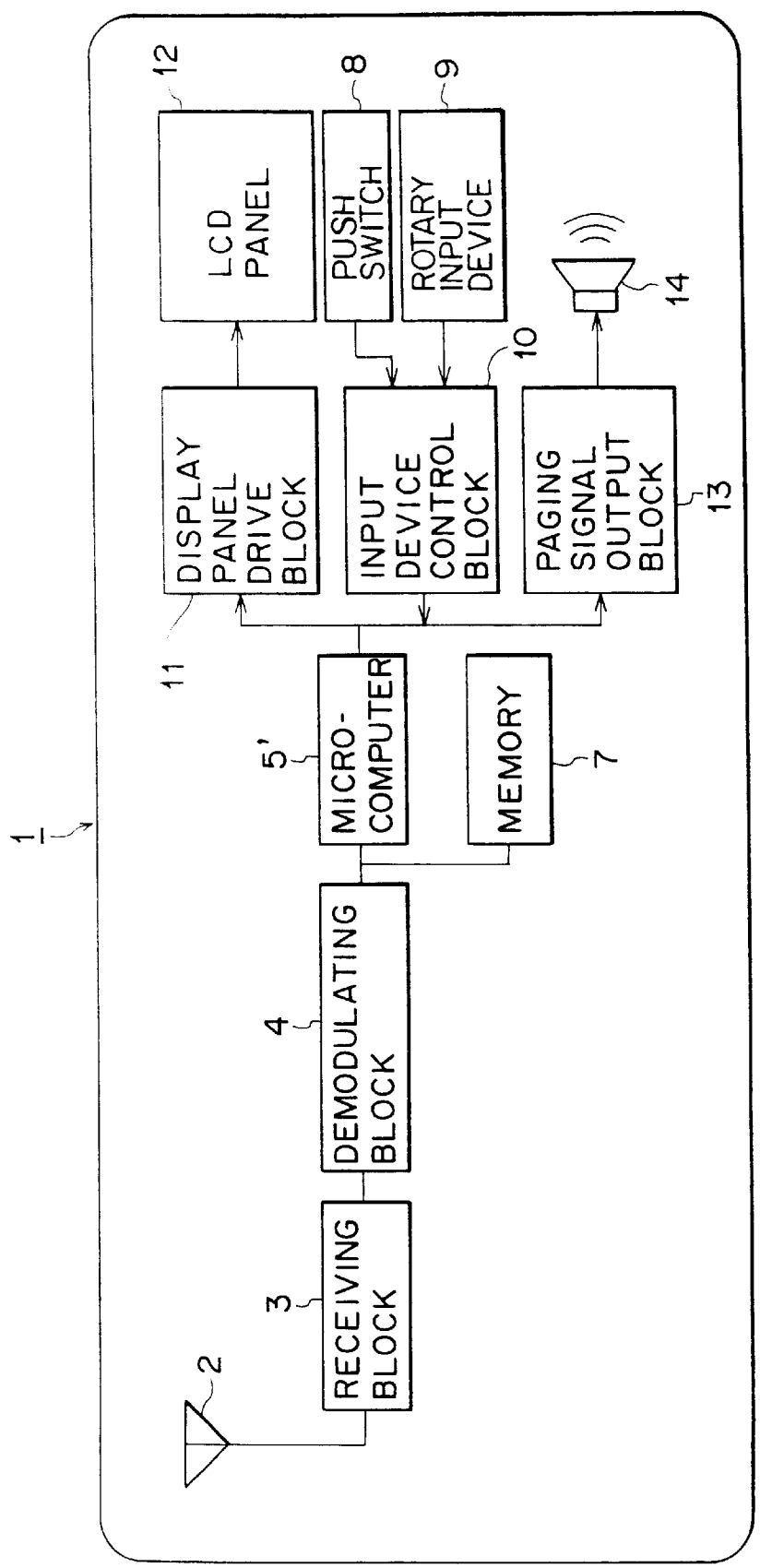
FIG. 2 is a block diagram illustrating an overall constitution of the portable information terminal apparatus shown in FIG. 1.
Figure 3:
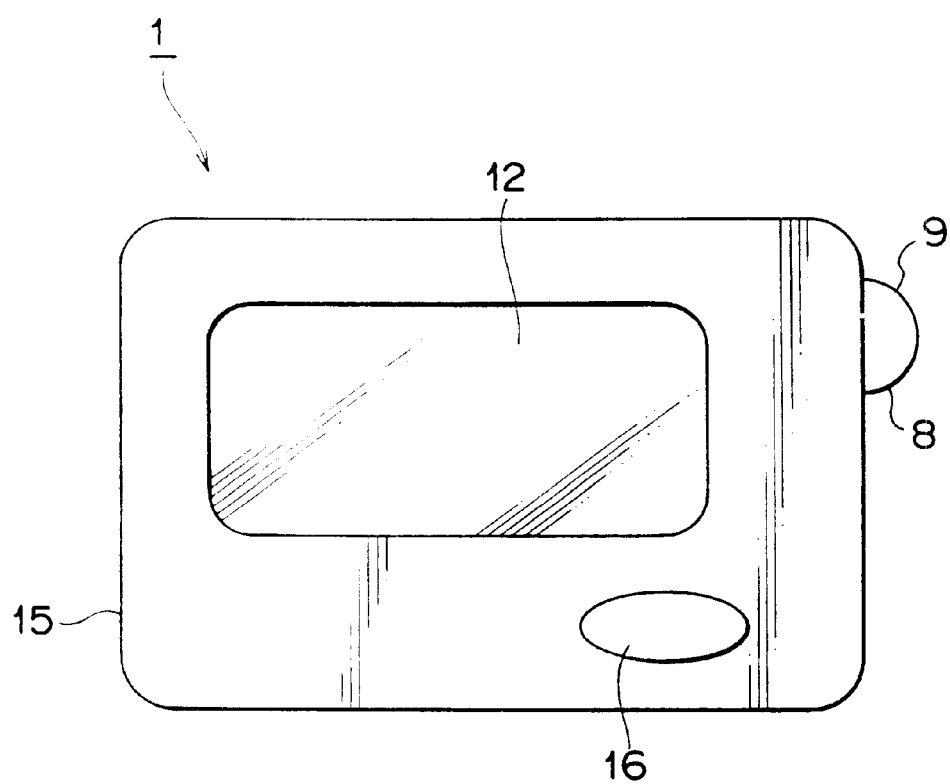
FIG. 3 is a top view of the external constitution of the portable information terminal apparatus of FIGS. 1 and 2.

Now, referring to FIG. 1, there is shown a block diagram illustrating the main constitution of a portable information terminal apparatus practiced as one preferred embodiment of the invention. FIG. 2 is a block diagram illustrating an overall constitution of the terminal apparatus shown in FIG. 1. FIG. 3 is a top view of the external constitution of the terminal apparatus shown in FIGS. 1 and 2.

As shown in FIG. 2, the portable information terminal apparatus 1 practiced as one preferred embodiment of the invention is a pager. This pager comprises an antenna 2 for receiving radio waves transmitted from a remote base station such as a radio base station, a receiving block 3, connected to the antenna 2, for amplifying and detecting a signal received at the antenna 2, and a demodulating block 4, which is a decoder connected to the receiving block 3, for decoding code information from the terminated signal. These components constitute a communication means.

The demodulating block 4 includes an A/D converter to generate digital information and has a capability of comparing an ID code stored in an ID memory not shown constituted by an EEPROM (Electrically Erasable Programmable ROM) for example and the above-mentioned encoded information to determine whether or not the received information is the information addressed to this terminal apparatus. The output of the demodulating block 4 is connected to a microcomputer 5'.

The microcomputer 5' is further connected to a message storage memory 7 constituted by an SRAM (Static Random Access Memory) for example.

The microcomputer 5' controls data processing and data input/output processing. To be more specific, based on various executable procedures (namely, programs) stored in an internal or external ROM, the microcomputer 5' controls the operations of the entire apparatus such as fetching and processing of an input signal supplied from an input device to be described later, writing of data to a message storage memory 7, organizing of files, generating and updating of a TOC (Table of Contents), reading of files, displaying of messages and other information onto the display screen, and notifying of call termination and troubles such as abnormal voltage.

The message information in the code information generated by the demodulating block 4 based on the terminated signal is written and stored in the message storage memory 7. The stored message information is then read to bed is played on the display screen. The message storage memory 7 can be constituted by any of such a nonvolatile memory as above-mentioned SRAM(Static RAM), a flash memory, or an EEPROM.

For the data input devices to be operated by the user, a rotary input device 9 and a push switch 8 integrated with the rotary input device 9 are arranged respectively. The rotary input device 9 and the push switch 8 are connected to an input device control block 10, which is connected to the microcomputer 5'.

Signals supplied from these input devices are inputted into the microcomputer 5' through the input device control block 10.

The microcomputer 5' is also connected to a display panel driving block 11, which is connected to a LED (Liquid Crystal Display) panel 12 serving as the display screen. Therefore, the display panel driving block 11 and the LED panel 12 form the display device.

A display signal outputted from the microcomputer 5' is sent to the display panel driving block 11. The display panel driving block 11 inputs a driving signal derived from the received display signal into the LED panel 12 to drive the same, thereby forming a display screen.

The display signal is transferred as a display image to an image file IF (see FIG. 6) constituting a part of an area of an incorporated working memory. Based on this display image, the driving signal is formed.

It should be noted that the image file IF may also be constituted by a dedicated memory VRAM (Video RAM, not shown.)

Further, the microcomputer 5' is connected to a paging signal output block 13, which is connected to a speaker 14 as a paging output device.

The paging signal outputted from the microcomputer 5' is inputted in the paging signal output block 13, in which the paging signal is converted into a voice signal, driving the speaker 14. It is apparent that a buzzer may be arranged in place of the speaker.

As described, the control means is formed by the microcomputer 5', the input device control block 10, and so on. The following describes in detail on the constitution of the main portion of the terminal apparatus including the contents of microcomputer 5'.

Referring to FIG. 1, a data transmitting means 20 serving as a data bus is connected to a CPU (Central Processing Unit) 5, a system ROM (Read Only Memory) 22, a ROM 6, a working memory 21, the message storage memory 7, an input signal processing block 10B, the display panel driving block 11, and the paging signal output block 13.

Therefore, the CPU 5 supplies and receives data to and from the system ROM 22, the ROM 6, the working memory 21, the message storage memory 7, the display panel driving block 11, the paging signal output block 13, and the input signal processing block 10B through the data transmitting means 20.

The system ROM 22 stores various control procedures for controlling the operations of the entire apparatus in the form of programs executable by the CPU 5.

The ROM 6 mainly stores application-associated execution procedures executable by the CPU 5. The ROM 6 is constituted by a read-only MOS (Metal Oxide Semiconductor) memory, a flash memory, or the like.

On the other hand, the working memory 21 is constituted by a RAM for example. Temporary data (for example, a look-up table LUT) that is generated during an operation of the CPU 5 is recorded in the working memory 21 preliminary.

The CPU 5 has an interrupt receiving terminal. Input signals 9a and 8a from the rotary input device 9 and the push switch 8 respectively provide interrupt signals through an interrupt interface 10A to be fetched at the interrupt receiving terminal of the CPU 5.

According to the above-mentioned constitution, when either the input signal 9a or 8a is generated by operating the rotary input device 9 or the push switch 8, the interrupt signal is inputted into the CPU 5 through the interrupt interface 10A, upon which the CPU 5 gets in an interrupt handling phase.

Figure 5:
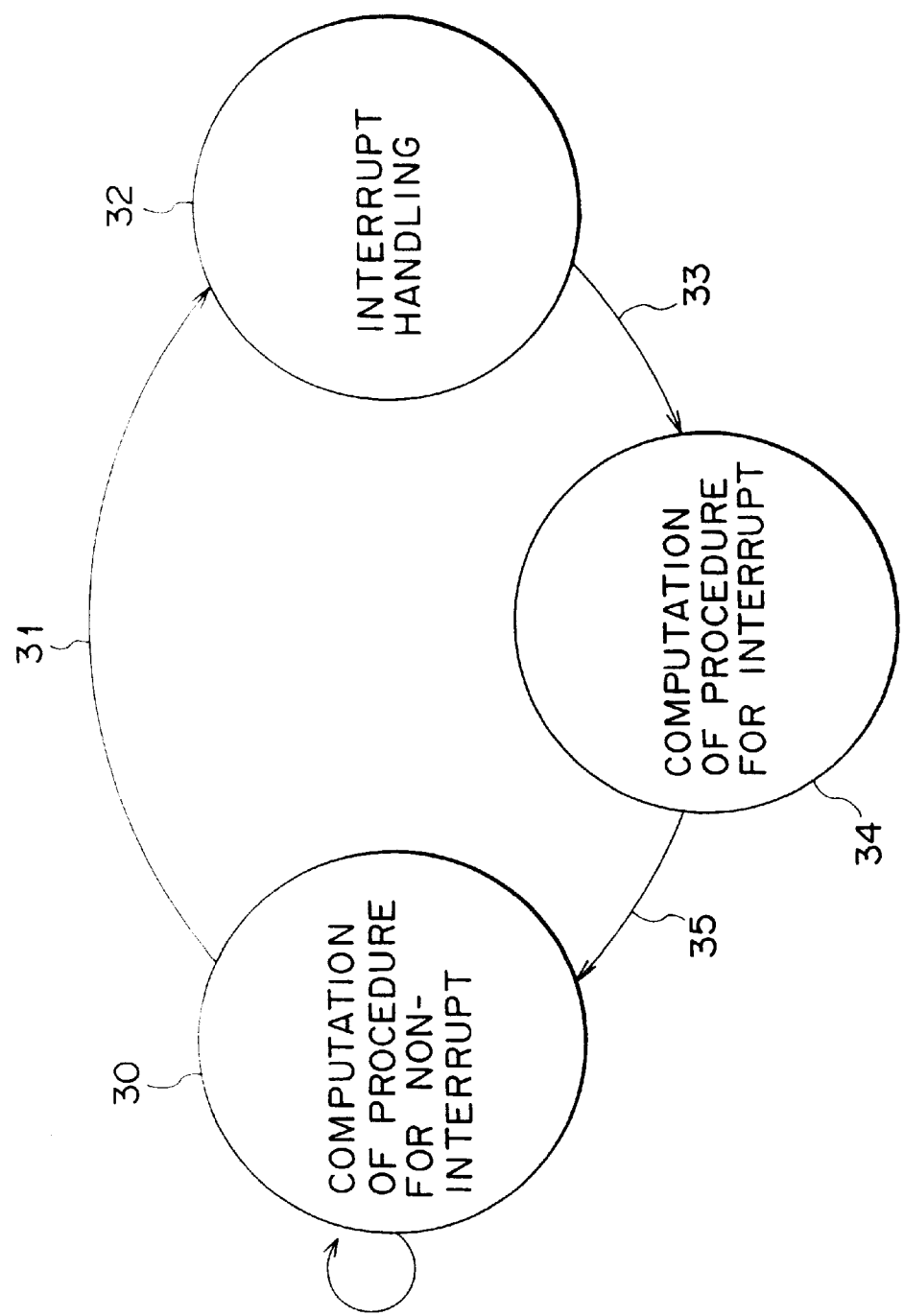
FIG. 5 is a state transition diagram illustrating handling processes of an interrupt caused by the data input device.

FIG. 5 shows the transitions of handling of an interrupt caused by the input device. First, the CPU 5 in the state of a computation processing 30 for a non-interrupt procedure receives an interrupt signal to detect an interrupt occurrence 31. Then, the CPU 5 executes an interrupt signal processing procedure stored in the system ROM 22 to process the interrupt signal. At this moment, CPU 5 identifies the input device that caused the interrupt procedure. This identification is made directly by the interrupt receiving terminal or based on supply of an input signal 10Aa to the input signal processing block 10B.

When the input device that caused the interrupt, namely the input device operated by the user has been identified, then, in processing 33, the CPU 5 reads the interrupt procedure corresponding to the identified input device from the system ROM 22 and gets in the state of computation processing 34 for computing the interrupt procedure. When an input value and so on supplied from the input device are established in processing 35, the interrupt handling is completed, upon which the CPU 5 returns to the computation processing 30 for non-interrupt procedure. In this stage, the input value supplied from the input device is used.

Figure 4:
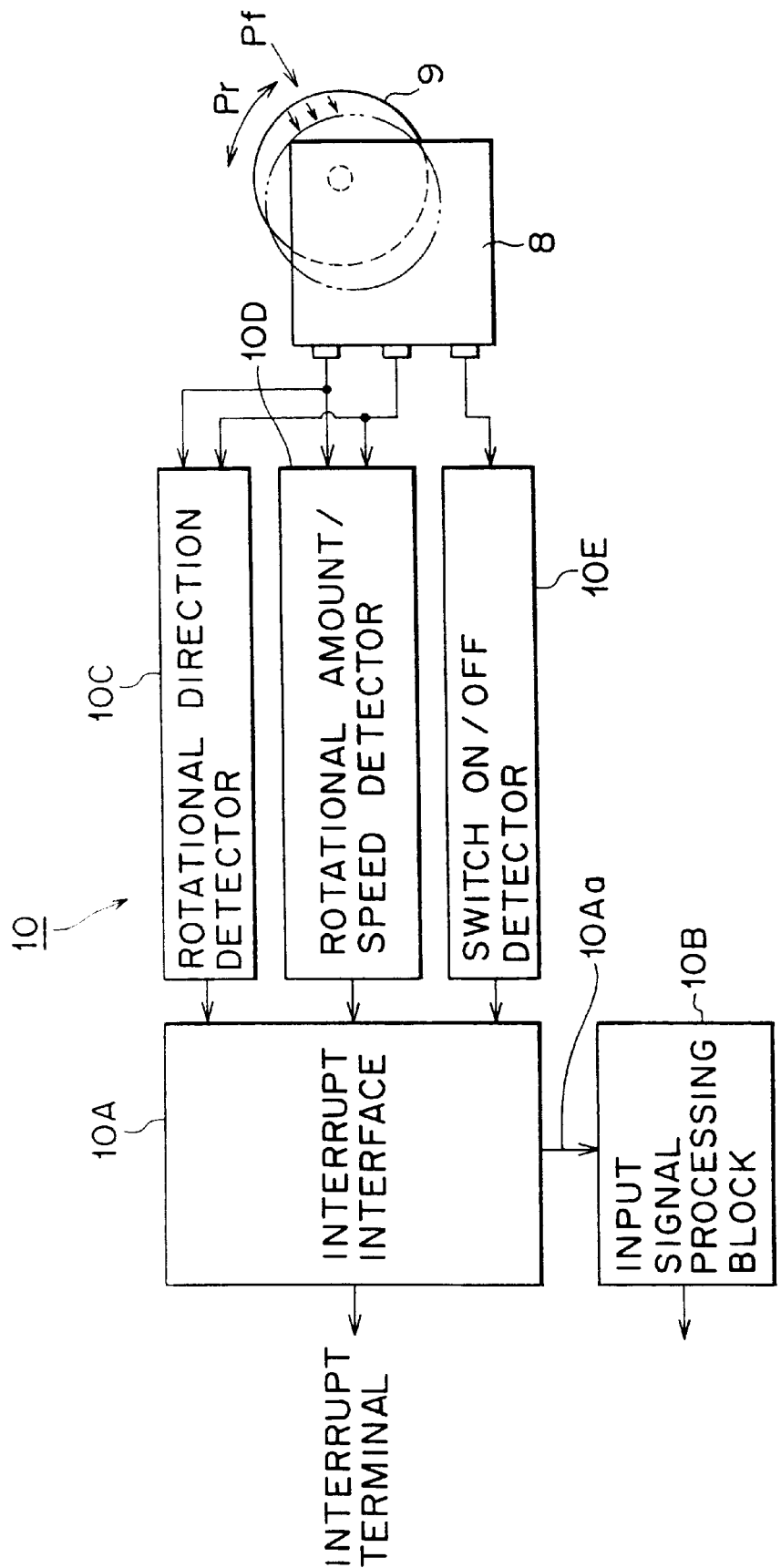
FIG. 4 is a block diagram illustrating an example of a rotary input device to be applied to the portable information terminal apparatus associated with the invention.

The following describes the details of the rotary input device 9 and the push switch 8. FIG. 4 shows an example of the constitution of a rotary input device. In this example, the rotary input device 9 and the push switch 8 are integrated with each other.

The rotary input device 9 has a rotary knob that can rotate in arrow directions Pr provided as a freely rotatable operator block. The user performs an input operation by rotating this operator block clockwise or counterclockwise, outputting a signal indicative of the rotational direction performed thereon.

On the other hand, when the user pushes the push switch 8 in arrow direction Pf, a switch on/off operation is effected, outputting an on/off signal thereon.

The rotational direction information of the knob of the rotary input device 9 is supplied to the interrupt interface 10A as a signal obtained by a rotational direction detector 10C from the rotary input device 9. Based on this signal, the interrupt interface 10A generates an interrupt signal and, at the same time, forms a signal 10Aa carrying the knob rotational direction information and supplies this signal to the input signal processing block 10B.

Upon receiving the signal 10Aa, the input signal processing block 10B immediately transfers the received signal to the data transmitting means 20 or temporarily holds the received signal and then transfers the same to the data transmitting means 20. This information is fetched when an up/down scroll command signal control means 26 stored in the ROM 6 is executed.

As described above, if the input signal processing block 10B immediately transfers the signal 10Aa without holding the same, the knob rotational direction information is used only once. Namely, one knob operation corresponds to one-time processing.

On the other hand, if the input signal processing block 10B holds the signal 10Aa before transferring the same, the knob rotational direction information can be used repetitively. Therefore, if the knob is in a continuously rotated state, the processing is repeated in that state.

As shown in FIG. 4, information about the rotational amount and speed of the knob of the rotary input device 9 may be inputted in the interrupt interface 10A as a signal obtained by a rotational amount/speed detector 10D constituting the input device control block 10 from the rotary input device 9, the signal may be fetched in subsequent processing.

The on/off information of the push switch 8 is also inputted into the interrupt interface 10A as a signal obtained by a switch on/off detector 10E constituting the input device control block 10 from the push switch 8.

The rotary input device 9 and the push switch 8 can be operated separately. Therefore, both can be operated at the same time to execute simultaneous data input operations.

The rotary input device 9 thus constituted can be implemented by a job dial or a rotary encoder for example, serving as a device for inputting command signals for overall control operations including changing values to be displayed. The push switch 8 establishes values of numerals to be displayed and inputs a signal for shifting a device operation from one mode to another for example.

The following describes various means stored in the ROM 6 with reference to FIG. 1.

As shown in the figure, the ROM 6 stores the up/down scroll command signal control means 26 capable of detecting the number of scroll command signals not yet processed among the up-scroll command signals and the down-scroll command signals, a display control means 27 that, based on the processing of the up/down scroll command signal control means 26, activates a partial screen update means 28 if there are at least two unprocessed scroll command signals and activates a total screen update means 29 if there is one unprocessed scroll command signal. The partial screen update means 28 for updating and displaying only a part of the display screen based on the processing of the display control means 27, and the total screen update means 29 for updating and displaying the entire display screen based on the processing of the display control means 27. These means are stored as procedures (namely, programs) that are executable by the CPU 5.

The program of each of the above-mentioned means may be of a form that executable directly or indirectly by CPU 5. Therefore, a form addressed as absolute binary is preferable. Alternatively, a form requiring readdressing at execution as relocatable binary may be used. In the latter case, however, a linkage means must be made resident in the system ROM 22 for example.

The following describes a constitution of the portable information terminal apparatus practiced as the above-mentioned embodiment with reference to FIG. 3. FIG. 3 shows a top view of the external constitution of this portable information terminal apparatus.

As shown in FIG. 3, the portable information terminal apparatus 1 is accommodated in a rectangular cabinet 15 which is low in profile. The LED panel 12 is arranged on the front side of the cabinet 15 in almost the center thereof, for displaying a message, date and time for example. A jog dial functioning as the rotary input device 9 is arranged in the upper right portion of the cabinet 15 in such a manner that a part of the jog dial projects from the cabinet 15. As described before, the rotary input device 9 has the freely rotatable knob which allows to rotate in both clockwise and counterclockwise direction.

The push switch 8 is arranged integrally with the rotary input device 9. Pushing the knob of the rotary input device 9 turns on/off the push switch 8.

An escape key 16 is embedded adjacent to the LED panel 12 in a freely pressing manner. The escape key 16 is pressed by the user to input a stop command signal for stopping the alarm sound notifying the termination of a call or a command signal for operation control.

In addition, the escape key 16 may be arranged slightly recessed towards inside of the cabinet 15 to prevent an external force from being easily applied to the escape key 16. This prevents an erroneous operation from occurring.

The LED panel 12 displays an display image composed of four lines, in which each line contains 20 alphanumeric characters or numerals for example.

The following describes operations of the above-mentioned portable information terminal apparatus. First, reception of a radio signal and display of a message, which are usual operations, will be described with reference to mainly FIG. 2.

When a radio wave carrying information (a message for example) addressed to the particular portable information terminal apparatus 1 is sent from a radio transmission base station, the portable information terminal apparatus 1 receives the radio wave at the antenna 2, performs such signal processing on the received radio wave as intermediate frequency conversion, amplification, and detection in the receiving block 3, confirms that the radio wave is addressed to the portable information terminal apparatus 1, demodulates the received information signal, and stores the demodulated information signal into the message storage memory 7 under the control of the microcomputer 5'.

Based on the control program stored in the ROM 6, CPU 5 of the microcomputer 5' controls the operation of the portable information terminal apparatus 1. First, the microcomputer 5' determines whether or not the information signal has been received. If the reception is found, the microcomputer 5' activates the display panel driving block 11 to display a message I alphabets and/or numerals onto the LED panel 12 in four lines each having 20 characters per screen based on the data contained in the received information read from the message storage memory 7.

At the same time, the microcomputer 5' activates the paging signal output block 13 to input the alarm signal into the speaker 14, from which the reception of the information signal is paged to the user.

In this state, the user reads the message shown on the LED panel 12. If the message cannot be displayed in one screen of the LED panel 12 composed of four lines each having 20 characters at maximum, then the user scrolls the display screen to read the following message to its end.

Figure 6:
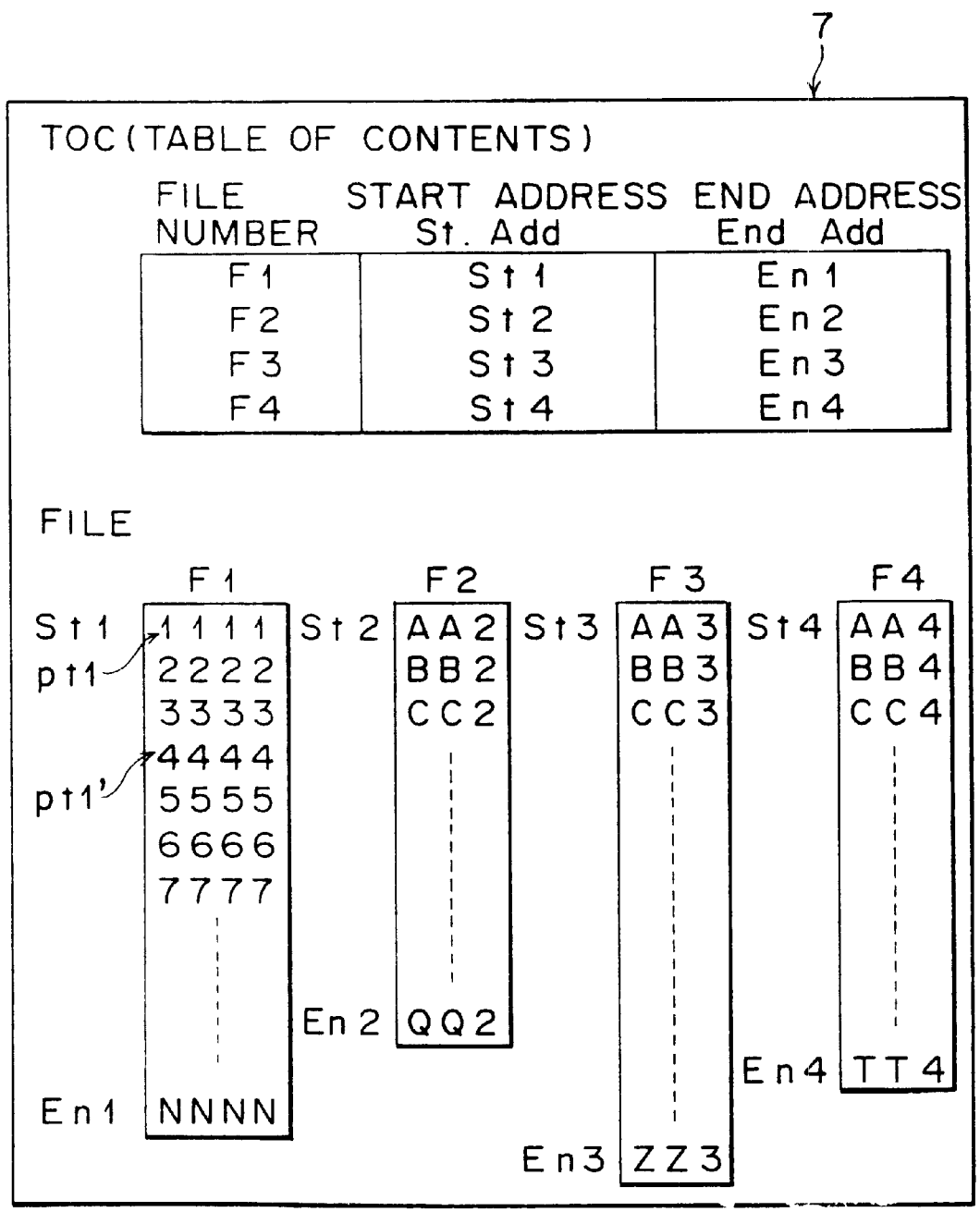
FIG. 6 is a diagram illustrating a file/table arrangement in the message recording memory of the portable information terminal apparatus associated with the invention.

The following describes the generation of a message file and the formation of an image file. FIG. 6 shows a file/table arrangement in the message storage memory 7. FIG. 7 shows an area/table arrangement in the working memory 21.

Every time the information signal is received and demodulated, message files F1, F2, F3, F4, and so on are generated in a file area FILE in the message storage memory 7. A message statement is stored in one message file Fi between start address Sti and end address Eni. In addition, an attribute record and a control record of that file are stored, but being omitted illustration and description of these records.

The start address and end address of the message file F1 are St1 and En1 respectively. Likewise, the start addresses of the message files F2, F3, and F4 are St2, St3, and St4 respectively. The end addresses of these files are En2, En3, and En4 respectively.

Therefore, each piece of data of the message statement (message data) in the message file F1 for example has an address of the message storage memory 7. For example, the first data in the message file F1 is a string of four numerals "1111" as shown, occupying 4 bytes. The first numeral 1 of the first data is start address St1 (decimal) of the message file F1.

Likewise, the second data is a string of four numerals "2222", and the address of the first numeral 2 being ST1+4 (decimal). The fourth data is a string of numerals "4444", and the address of the last numeral 4 being St1+15 (decimal)

In the message storage memory 7, a TOC (Table of Contents) is formed. The TOC lists up the file numbers and the start addresses and end addresses of the message files. Therefore, every time a message file is deleted or generated, the TOC is updated accordingly.

Consequently, in a file access operation, the TOC is first referenced for a file number, from which the start address of a target file is determined. Then, at the corresponding address in the message storage memory 7, the target data can be read.

On the other hand, as shown in FIG. 7, the working memory 21 stores a LUT (Look Up Table) recording, as entry point pti, the address of the most recently displayed data for each message file.

For example, if entry point of the file number F1 is pt1', the start of the most recent display screen is the numeric character string "4444" starting with address pt1' as shown in FIG. 6. Therefore, the entry point pti in the LUT dynamically varies responsive to scrolling for example.

The working memory 21 also stores an image file (IF) equivalent to a VRAM. A data sequence written to the image file provides an image to be displayed on the display screen. Therefore, by partially rewriting the data in the IF partially updates the display screen. By totally rewriting the data updates the display screen in its entirety.

Figure 8:
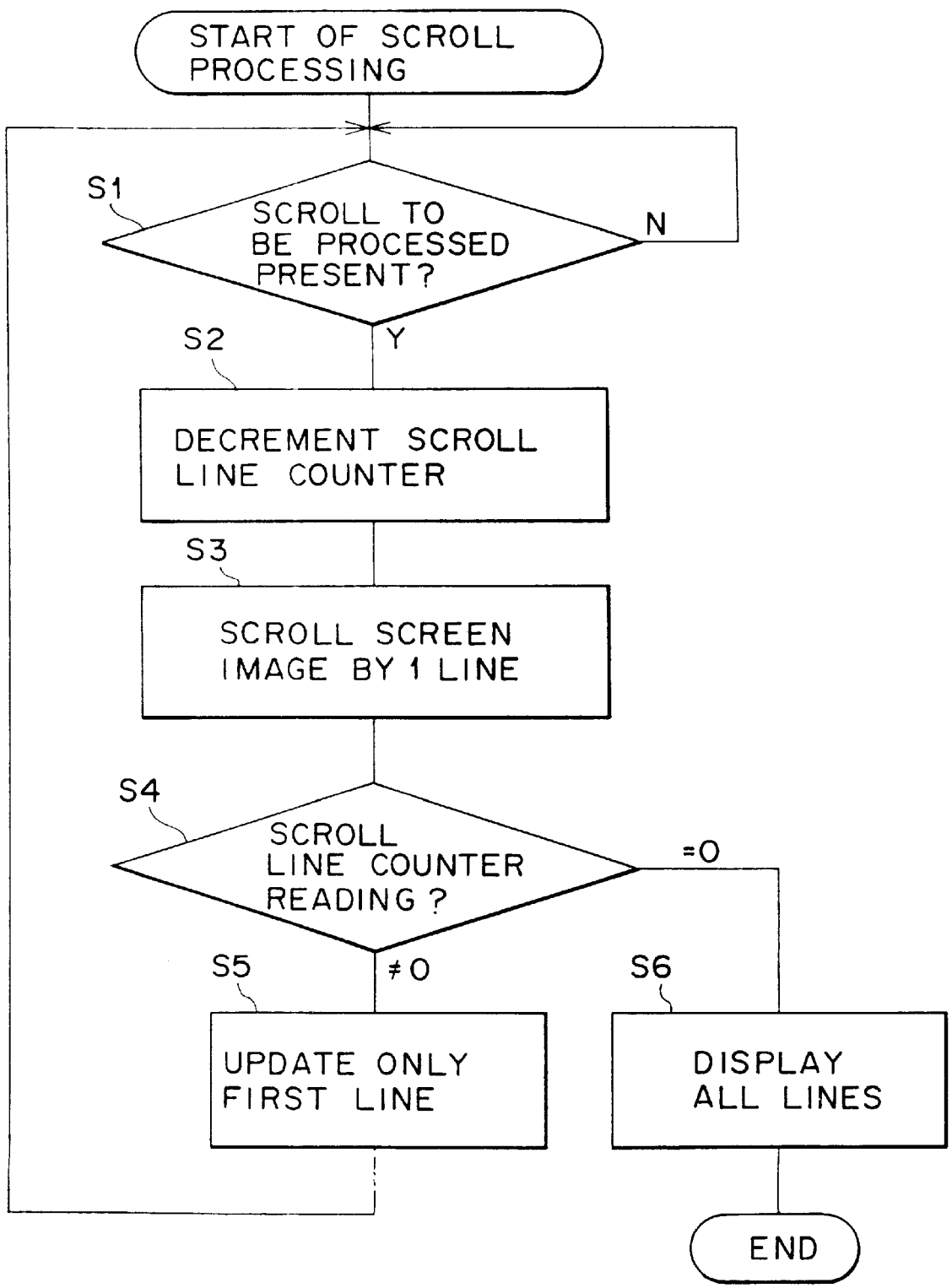
FIG. 8 is a flowchart indicative of a scroll operation of the portable information terminal apparatus shown in FIG. 1.
Figure 9:
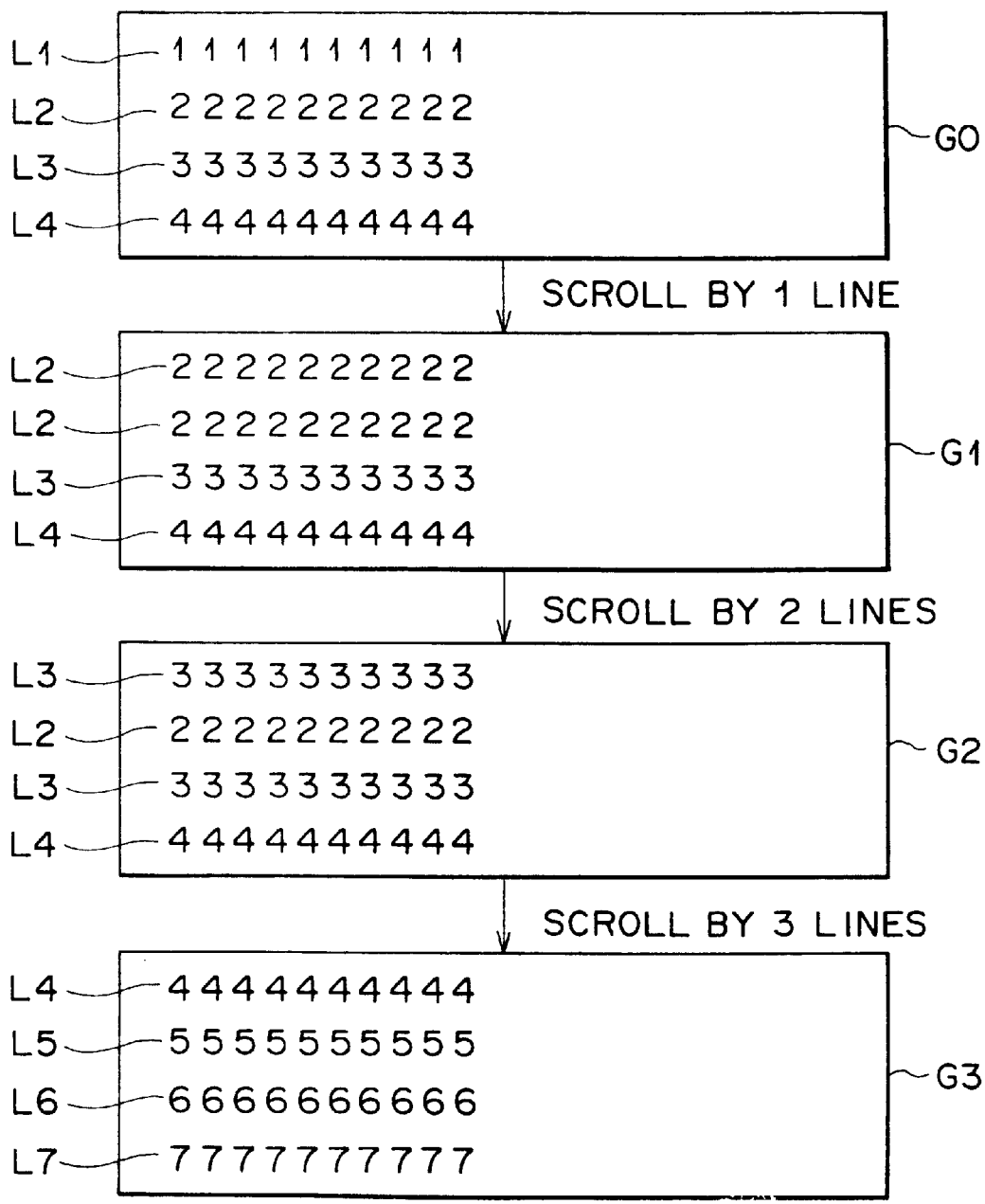
FIG. 9 is a diagram illustrating the transition of the display screens in the continuous scroll processing on the portable information terminal apparatus shown in FIG. 1.

The following describes a scroll operation. FIG. 8 shows a flowchart indicative of a scroll operation of the portable information terminal apparatus 1. FIG. 9 shows an example of display screens to be displayed when scroll processing is performed three times consecutively.

First, in step S1, when the CPU 5 executes the up/down scroll command signal control means 26 stored in the system ROM 22, the number of unprocessed scroll command signals is detected. Then, the display control means 27 operates to check any unprocessed scroll command signal.

If at least two unprocessed scroll command signals, or one unprocessed scroll command signal is found, then, in step S2, the value of a scroll line counter is decremented by one.

Next, in step S3, the display control means 27 scrolls up or down by one line the display image written to the display image area in the working memory 21.

It should be noted that this display image area is different from the above-mentioned IF (image file.) The original display image after scrolling is contained in the display image area. When all or part of the display image is transferred from the display image area to the IF, the transferred image in the image file is displayed on the screen without change.

In step S4, the display control means 27 checks the value of the scroll line counter. If the value is not 0, the display control means 27 determines that there are at least two unprocessed scroll command signals, therefore continuous scroll operations are going on and the last scroll processing has not yet started.

In step S5, based on this determination, the display control means 27 activates the partial screen update means 28 to partially update the display screen. For example, only the top line on the display screen is updated, leaving the rest on the display screen unchanged. This operation is executed by transferring only the image of the top line in the display image area to the IF.

As described, the screen image displayed during the continuous execution of scroll processing is updated not entirely but partially, thereby ending this scroll processing as early as possible to execute the next scroll processing without delay. Consequently, the loads on the CPU, the display device and its peripheral circuits can be mitigated to substantially enhance a response speed, thereby ensuring a smooth screen display even during continuous scroll processing.

On the other hand, if the value of the scroll line counter is found to be 0 in step S4, the display control means 27 determines that there is one unprocessed scroll command signal and therefore the current scroll processing is a one-shot scroll operation or the last scroll operation in a scroll processing sequence.

In step S6, based on this determination, the display control means 27 activates the total screen update means 29, which updates the display screen in its entirety. This operation is executed by transferring the entire image in the IF display image area to the IF.

Thus, the displaying of the entirely updated screen at the final stage completes continuous scroll processing without involving functional problems.

As described before, FIG. 9 shows an example of display screens to be displayed when scroll processing is performed three times downwardly consecutively. The display screens in this figure are schematic representations of the display screen actually shown on the image display device. Unlike the images developed on the above-mentioned display image area, these images are substantially the same as the images developed on the IF.

An original display image before scrolling is G0, in which four lines, namely top line L1, second line L2, third line L3, and bottom line L4, are shown.

When the first down scroll processing is executed, the display image goes G1 to replace the top line with the line L2 on the display screen, but not updating the second line L2, the third line S3, and the bottom line L4. Therefore, the display after the first down scrolling is established in a short time.

Next, when the second down scroll processing is executed, the display image goes G2 to replace the top line with the line L3, but not updating the second line L3, the third line L3, and the bottom line. Therefore, the display after the second down scrolling is established in a short time.

When the third down scroll processing is executed, the display image goes G3 to update the display screen in its entirety because this is the last scroll processing, and thereby the top line becoming L4, the second line becoming L5, the third line becoming L6, and the bottom line becoming L7, displaying the last display image. Thus, the sequence of down scroll processing operations has been smoothly completed until the final display appears by establishing the intermediate display screens in a short time.

Figure 10:
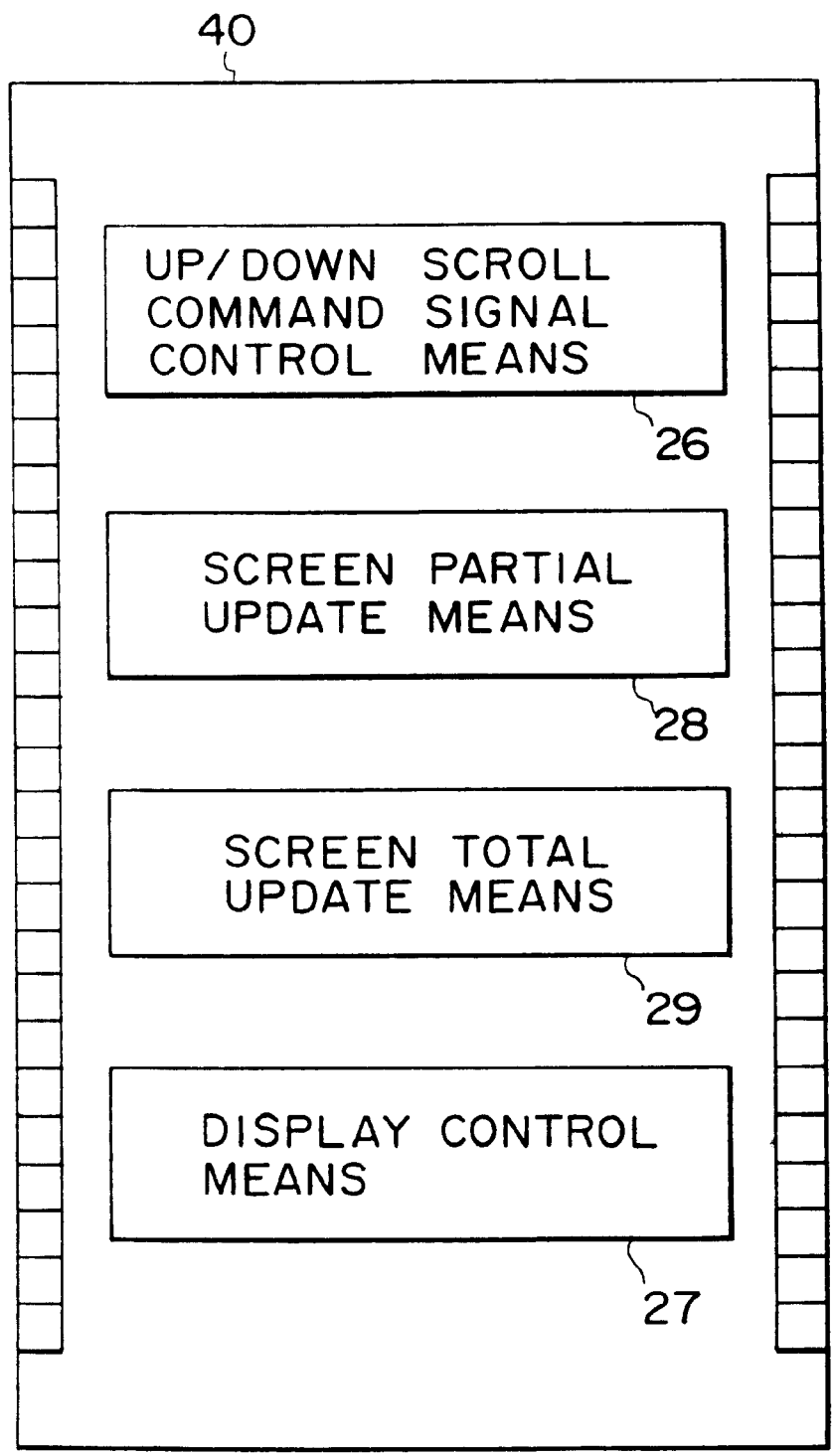
FIG. 10 is a diagram illustrating a constitution of a recording medium practiced as a second preferred embodiment of the invention.

FIG. 10 shows a constitution of a recording medium practiced as a second preferred embodiment of the invention. The following describes this recording medium with reference to FIG. 10.

The recording medium 40 is a one-chip semiconductor memory storing at least four means in the form of programs (or procedures) readable and executed by a computer.

The first means is the up/down scroll command signal control means 26. This means is read and executed by the CPU of the computer to detect an unprocessed up/down scroll command signal.

The second means is the display control means 27. This means is read and executed by the CPU of the computer to count the number of unprocessed up/down scroll command signals detected by the first means. If there are at least two such signals, the second means activates the partial screen update means 28 to be described later. If there is only one such a signal, the second means activates the total screen update means 29 to be described later.

The third means is the partial screen update means 28. The third means is read and executed by the CPU of the computer to update only a part of a display screen.

The fourth means is the total screen update means 29. This means is read and executed by the CPU of the computer to update a display screen in its entirety.

Therefore, installing, as a memory storing a CPU operating procedure, the recording medium 40 on a portable information terminal apparatus having a CPU and a rotary input device can realize the portable information terminal apparatus having capabilities of partially updating the intermediate display screens in continuous scroll processing, resulting in a totally updated final display screen.

The recording medium 40 can be constituted by a flash memory, a read-only MOS (Metal Oxide Semiconductor) memory, an SRAM (Static RAM), an EPROM (Erasable Programmable ROM), an EEPROM, or any other nonvolatile semiconductor recording medium.

Alternatively, the recording medium 40 can be constituted by an optical recording medium, a magneto-optic recording medium, or a magnetic recording medium.

Figure 11:
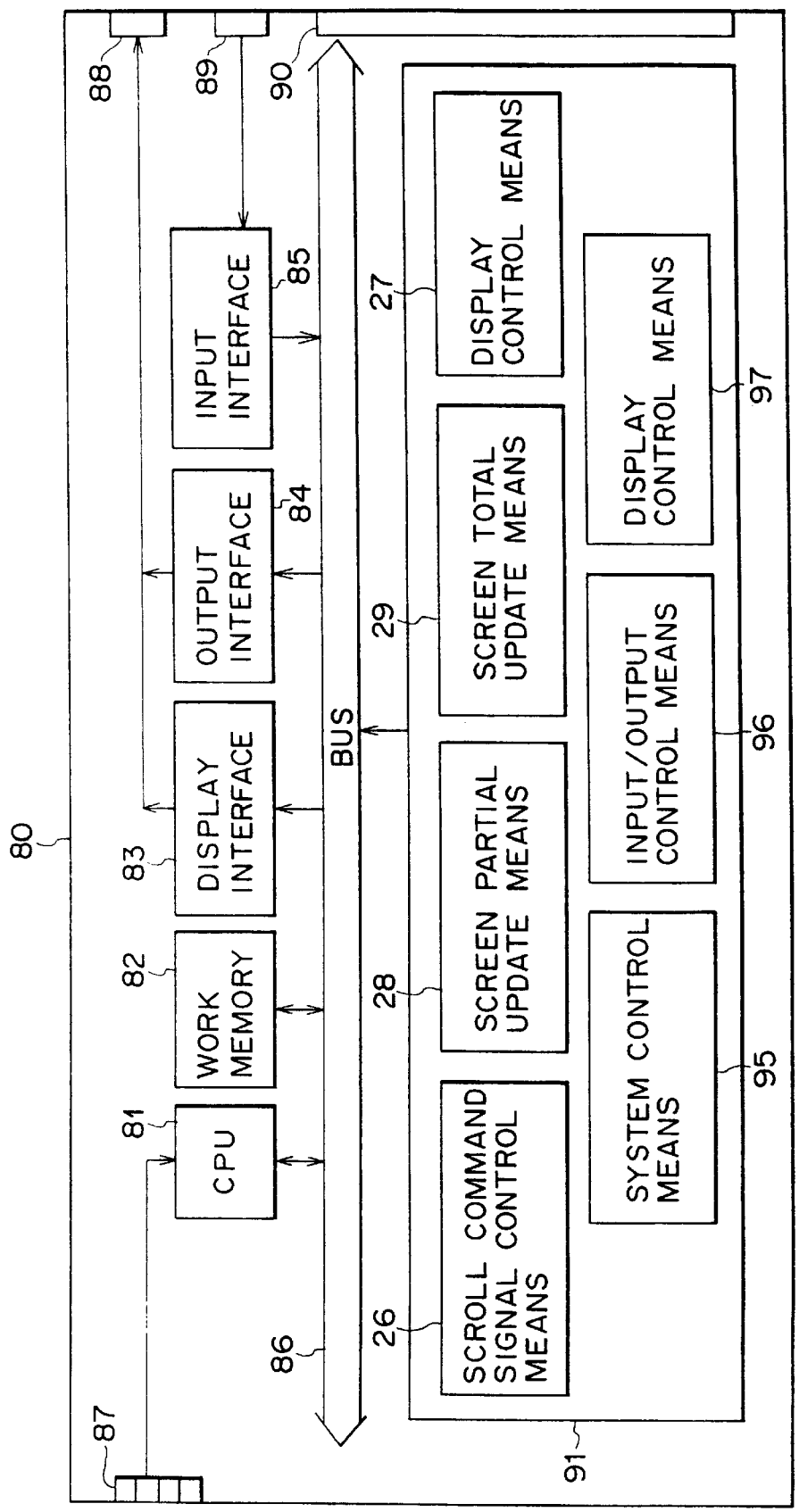
FIG. 11 is a block diagram illustrating a microcomputer apparatus practiced as a third preferred embodiment.

FIG. 11 is a block diagram illustrating a microcomputer apparatus practiced as a third preferred embodiment of the invention. The following describes the microcomputer apparatus with reference to FIG. 11.

The microcomputer apparatus 80 is constituted by a one-chip microcomputer incorporating an internal bus 86 which is each connected to a CPU 81, a working memory 82, a display interface 83, an output interface 84, an input interface 85, and a memory block 91.

External terminals provided on the one-chip microcomputer include an interrupt input terminal 87 connected to the interrupt input of the CPU 81, an output terminal 88 connected to the display interface 83 and the output interface 84, an input terminal connected to the input terminal 85, and a common bus terminal 90 connected to the internal bus 86.

The memory block 91 stores, as programs executable by the CPU 81, a system control means 95, an input/output control means 96, a display control means 97, the up/down scroll command signal control means 26, the partial screen update means 28, and the total screen update means 29.

The system control means 95 not only controls the operations of the components of the one-chip microcomputer 80, but also an entire system in which the microcomputer 80 is incorporated. The control procedure depends on each system in which the microcomputer 80 is incorporated.

Likewise, the input/output control means 96 not only controls the transfer of data and signals between the microcomputer 80 and the outside thereof but also controls the transfer of data and signals between the system in which the microcomputer 80 is incorporated and the outside of the system. The control procedure depends on the system in which the microcomputer 80 is incorporated.

On the other hand, the display control means 97 controls display on an image display device externally connected to the microcomputer 80, controlling all screen display operations other than scrolling.

The up/down scroll command signal control means 26 is read and executed by the CPU 81 to detect an unprocessed up/down scroll command signal.

The display control means 27 is read and executed by the CPU 81 to counts the number of unprocessed up/down scroll command signals detected by the up/down scroll command signal control means 26. If at least two such signals are found, the display control means 27 activates the partial screen update means 28. If only one such a signal is found, the display control means 27 activates the total screen update means 29.

The partial screen update means 28 is read and executed by the CPU 81 to partially update a display screen.

The total screen update means 29 is read and executed by the CPU 81 to totally update a display screen.

Installing the microcomputer 80 on a portable information terminal apparatus having a communication block, a recording memory for received messages, a rotary input device, a display device for displaying messages and so on, and a power supply circuit easily provides this portable information terminal apparatus with a high-speed scroll processing capability.

What is claimed is:

1. A display screen scroll method for scrolling a display screen by a number of times a scroll command signal is provided, comprising the steps of:

partially updating said display screen and displaying a partially updated display screen if at least two unprocessed scroll command signals are found; and entirely updating said display screen and displaying an entirely updated screen if there remains only one unprocessed scroll command signal.

2. The display screen scroll method for scrolling a display screen as set forth in claim 1, wherein said display screen method is applied to a portable information terminal apparatus.

3. A portable information terminal apparatus, comprising:

radio communication means;

control means for at least executing data processing;

a display screen capable of executing at least one of upward scrolling and downward scrolling at least by a display line basis; and an input device for generating at least one of an up-scroll command signal and a down-scroll command signal according to an operation of said input device by a user, wherein a radio wave transmitted from a transmission base station is received by said radio communication means and said control means extracts information from a terminating signal carried by said radio wave and displays at least said information onto said display screen, said portable information terminal apparatus further comprising:

up/down scroll command signal control means capable of detecting a number of unprocessed scroll command signals;

display control means for activating a partial screen update means if at least two unprocessed scroll command signals are found based on processing executed by said up/down scroll command signal control means and for activating a total screen update means if only one unprocessed scroll signal is found remaining;

wherein said partial screer updating means partially updates said display screen based on processing by said display control means, and said total screen update means totally updates said display screen based on processing by said display control means.

4. The portable information terminal apparatus as set forth in claim 3, wherein said input device has an operation block rotatable clockwise and counterclockwise, so that by rotating said input device a plurality of up-scroll command signals or down-scroll command signals are generated in a unit time.

5. A recording medium for at least storing programs readable and executable by a computer, comprising:

scroll command signal control means for detecting a number of unprocessed scroll command signals; and display control means for activating a partial screen update means if at least two unprocessed scroll command signals are found based on processing executed by said scroll command signal control means and for activating a total screen update means if only one unprocessed scroll signal is found wherein said partial screen updating means partially updates a display screen based on processing by said display control means, and said total screen update means totally updates said display screen based on processing by said display control means.

6. A microcomputer apparatus comprising:

a central processing unit;

a recording block for recording Procedures as programs readable and executable by said central processing unit; and data transmitting means incorporating a data transmitting block at least connected to said central processing unit and said recording block and connectable from an outside of said microcomputer apparatus to transmit a signal processed based on processing by said central processing unit to an external device in one of a cabled and a wireless manner;

wherein said programs include:

scroll command signal control means for detecting a number of unprocessed scroll command signals, and display control means for activating a partial screen update means if at least two unprocessed scroll command signals are found based on processing executed by said scroll command signal control means and for activating a total screen update means if only one unprocessed scroll signal is found, wherein said partial screen updating means partially updates a display screen based on processing by said display control means, and said total screen update means totally updates said display screen based on processing said display control means.

* * * * *